(12) United States Patent
Beuschel et al.

(10) Patent No.: US 12,085,676 B2
(45) Date of Patent: Sep. 10, 2024

(54) METHOD FOR CONTROLLING SENSOR ELEMENTS OF A LIDAR MEASURING SYSTEM

(71) Applicant: Microvision, Inc., Redmond, WA (US)

(72) Inventors: Ralf Beuschel, Wangen (DE); Rainer Kiesel, Stetzingen (DE)

(73) Assignee: Microvision, Inc., Redmond, WA (US)

( * ) Notice: Subject to any disclaimer, the term of this patent is extended or adjusted under 35 U.S.C. 154(b) by 958 days.

(21) Appl. No.: 17/046,629

(22) PCT Filed: Apr. 3, 2019

(86) PCT No.: PCT/EP2019/058392
§ 371 (c)(1),
(2) Date: Oct. 9, 2020

(87) PCT Pub. No.: WO2019/197241
PCT Pub. Date: Oct. 17, 2019

(65) Prior Publication Data
US 2021/0109196 A1    Apr. 15, 2021

(30) Foreign Application Priority Data

Apr. 10, 2018  (DE) .......................... 102018205378.2

(51) Int. Cl.
*G01S 7/481* (2006.01)
*G01S 7/484* (2006.01)
*G01S 7/4865* (2020.01)
*G01S 17/18* (2020.01)

(52) U.S. Cl.
CPC ............ *G01S 7/4815* (2013.01); *G01S 7/484* (2013.01); *G01S 7/4865* (2013.01); *G01S 17/18* (2020.01)

(58) Field of Classification Search
None
See application file for complete search history.

(56) References Cited

U.S. PATENT DOCUMENTS

| 4,322,832 A | 3/1982 | Sartorius |
| 9,784,835 B1 | 10/2017 | Droz |
| 2004/0233942 A1 | 11/2004 | Schlueter |

(Continued)

FOREIGN PATENT DOCUMENTS

| DE | 2923963 | 11/1980 |
| DE | 10130763 | 1/2003 |

(Continued)

OTHER PUBLICATIONS

Office Action issued in Japanese Patent Application No. JPO 2020-555232 mailed from the Japan Patent Office on Nov. 24, 2021.

(Continued)

*Primary Examiner* — Eric L Bolda
(74) *Attorney, Agent, or Firm* — Kevin D. Wills

(57) ABSTRACT

A method for controlling sensor elements of a LIDAR measuring system, wherein a sensor element is activated and deactivated during a measurement cycle, wherein a measurement process comprises a plurality of measurement cycles, wherein the sensor element is activated at a first time during a first measurement cycle and the same sensor element is activated at a second time during a second measurement cycle.

20 Claims, 4 Drawing Sheets

(56) References Cited

U.S. PATENT DOCUMENTS

| | | |
|---|---|---|
| 2007/0121095 A1 | 5/2007 | Lewis |
| 2007/0182949 A1 | 8/2007 | Niclass |
| 2009/0009747 A1 | 1/2009 | Wolf |
| 2012/0205522 A1 | 8/2012 | Richardson |
| 2015/0028190 A1 | 1/2015 | Shin |
| 2015/0109414 A1* | 4/2015 | Adam .................. H04N 13/296 |
| | | 348/46 |
| 2015/0124137 A1 | 5/2015 | Sato |
| 2015/0285625 A1 | 10/2015 | Deane |
| 2016/0209498 A1 | 7/2016 | Kanter |
| 2016/0266253 A1 | 9/2016 | Kubota |
| 2016/0284743 A1 | 9/2016 | Mellot |
| 2017/0176575 A1 | 6/2017 | Smits |
| 2017/0184704 A1 | 6/2017 | Yang |
| 2017/0187721 A1 | 6/2017 | Raynor |
| 2017/0242126 A1* | 8/2017 | Matsuo .................. G01S 17/10 |
| 2018/0113200 A1 | 4/2018 | Steinberg |
| 2018/0209846 A1* | 7/2018 | Mandai .................. G01S 17/894 |
| 2018/0239003 A1* | 8/2018 | Kondo .................. G01B 11/24 |
| 2018/0259645 A1* | 9/2018 | Shu ........................ G01S 7/4865 |
| 2018/0324416 A1 | 11/2018 | Kim |
| 2019/0383946 A1* | 12/2019 | Namba .................. G01S 7/4808 |
| 2019/0391266 A1* | 12/2019 | Mori ....................... G02B 7/32 |
| 2021/0116545 A1 | 4/2021 | Hakspiel |
| 2021/0156975 A1 | 5/2021 | Beuschel |
| 2021/0165079 A1 | 6/2021 | Beuschel |

FOREIGN PATENT DOCUMENTS

| | | |
|---|---|---|
| DE | 102006013290 | 9/2007 |
| DE | 102008005129 | 5/2009 |
| DE | 102009029372 | 3/2011 |
| DE | 102011005740 | 9/2012 |
| DE | 102014207599 | 10/2015 |
| DE | 102015106635 | 11/2016 |
| DE | 102017121346 | 3/2018 |
| DE | 102017222974 | 6/2019 |
| DE | 102017222972 | 7/2019 |
| JP | 2595354 | 4/1997 |
| JP | 2004157044 | 6/2004 |
| JP | 2011095027 | 5/2011 |
| JP | 2012242218 | 12/2012 |
| JP | 2017003391 | 1/2017 |
| JP | 2018025449 | 2/2018 |
| KR | 1020160142839 | 12/2016 |
| WO | WO2015157341 | 10/2015 |
| WO | 2017081294 | 5/2017 |
| WO | 2018172115 | 9/2018 |
| WO | 2019115184 | 6/2019 |
| WO | 2019115185 | 6/2019 |

OTHER PUBLICATIONS

Hakspiel; U.S. Appl. No. 17/042,821, filed Sep. 28, 2020.
Office Action issued in Israel Patent Application No. 277855 mailed from the Israel Patent Office on Nov. 15, 2022.
USPTO; Notice of Allowance issued in U.S. Appl. No. 16/954,170 mailed Dec. 1, 2022.
USPTO; Non-Final Office Action issued in U.S. Appl. No. 16/954,170 mailed Jul. 15, 2022.
USPTO: Non-Final Office Action issued in U.S. Appl. No. 16/954,135 mailed Jul. 13, 2022.
Beuschel; U.S. Appl. No. 16/954,135, filed Jun. 15, 2020.
Beuschel; U.S. Appl. No. 16/954,170, filed Jun. 15, 2020.
English Translation of the International Search Report for PCT/EP2018/081990 issued by the European Patent Office on Feb. 11, 2019.
English Translation of the International Search Report for PCT/EP2018/081992 issued by the European Patent Office on Feb. 14, 2019.
Office Action issued in Japanese Patent Application No. JPO 2020-552106 mailed from the Japan Patent Office on Nov. 24, 2021.
English Translation of the International Search Report for PCT/EP2019/058392 mailed by the European Patent Office on Jul. 4, 2019; 2 pages.
English Translation of International Search Report for International Application No. PCT/EP2019/058394 mailed by the European Patent Office on Jul. 1, 2019.

\* cited by examiner

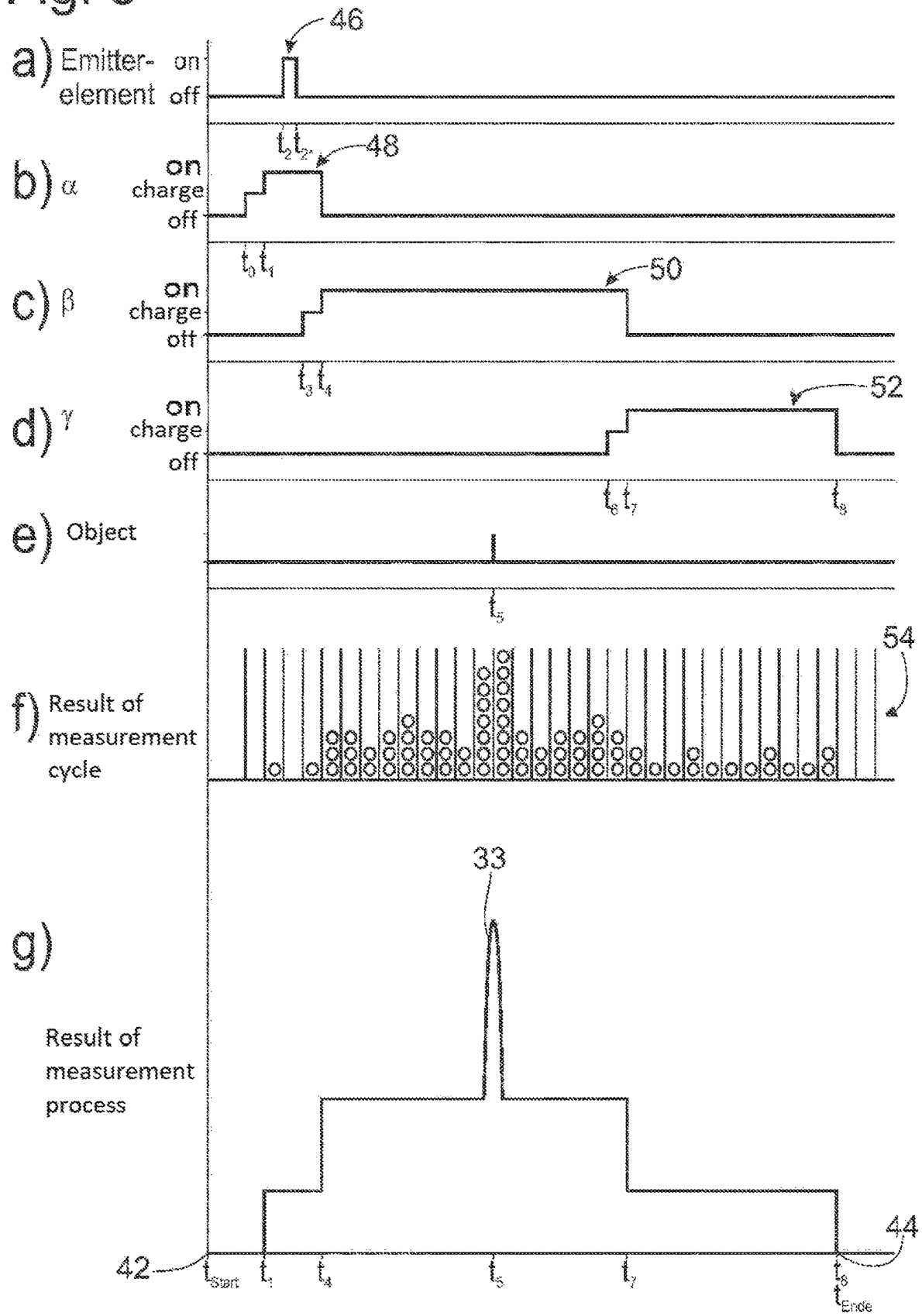

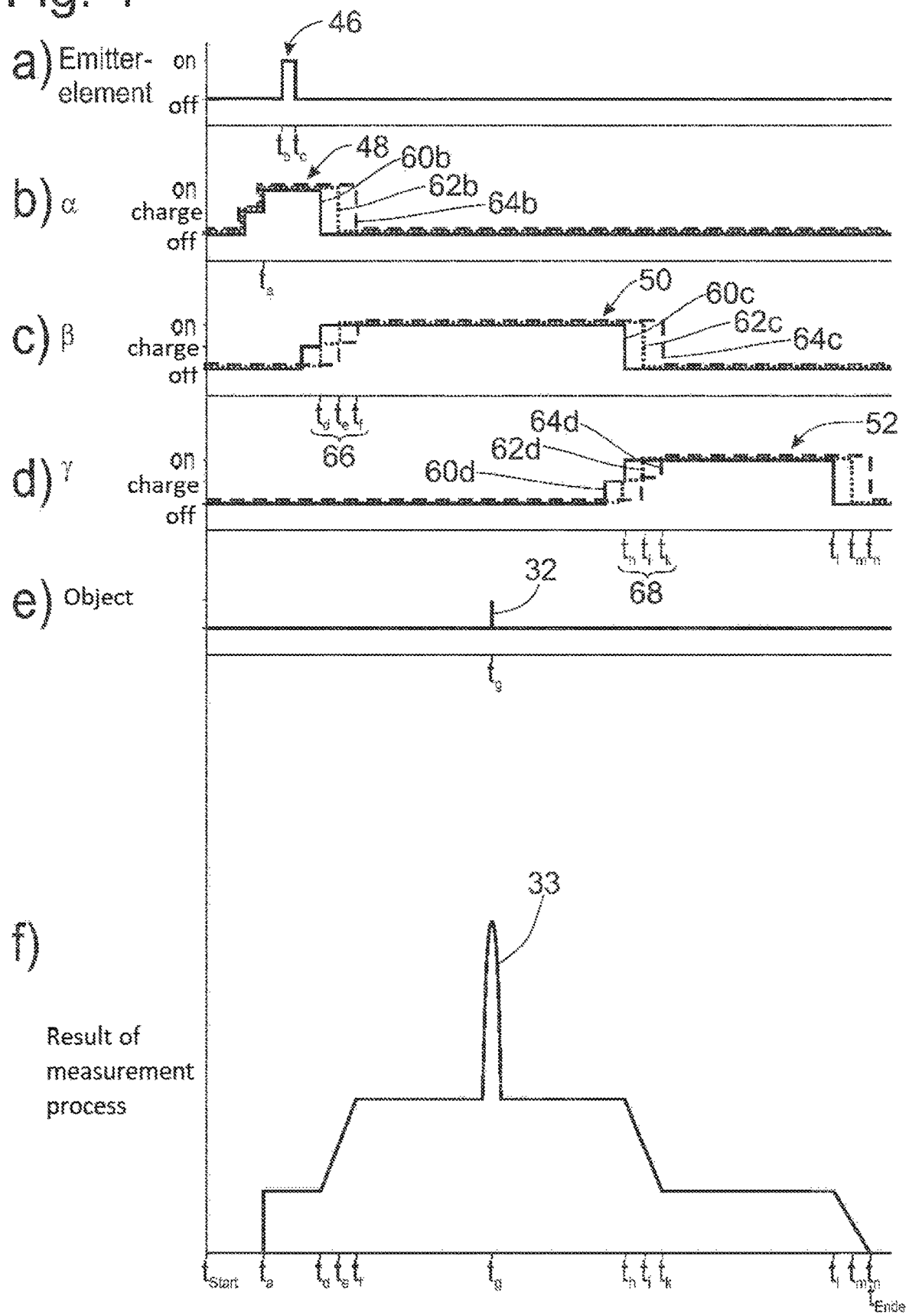

METHOD FOR CONTROLLING SENSOR ELEMENTS OF A LIDAR MEASURING SYSTEM

CROSS-REFERENCE TO RELATED APPLICATIONS

This patent application is the national phase of PCT Application No. PCT/EP2019/058392, filed Apr. 3, 2019, which claims the benefit of German Patent Application No. 10 2018 205 378.2, filed Apr. 10, 2018, both of which are incorporated in their entirety herein by reference.

BACKGROUND OF THE INVENTION

1. Field of the Invention

The invention relates to a method for controlling sensor elements of a LIDAR measuring system.

2. Discussion of the Related Art

A LIDAR measuring system is described in WO 2017 081 294. This is statically designed and comprises a transmitter unit with a multiplicity of emitter elements and a receiver unit with a multiplicity of sensor elements. The emitter elements and the sensor elements are implemented in a focal plane array configuration and arranged at a focal point of a respective transmitting lens and receiving lens. With regard to the receiver unit and the transmitter unit, a sensor element and a corresponding emitter element are assigned to a specific solid angle. The sensor element is therefore assigned to a specific emitter element.

SUMMARY OF THE INVENTION

Several embodiments of the invention advantageously address the needs above as well as other needs by providing a method for controlling sensor elements of a LIDAR measuring system, wherein a sensor element is activated and deactivated during a measurement cycle, wherein a measurement process comprises a plurality of measurement cycles, and wherein in a first measurement cycle the sensor element is activated at a first time and in a second measurement cycle the same sensor element is activated at a second time.

In another embodiment, the invention can be characterized as a method for controlling sensor elements of a LIDAR measuring system, wherein a sensor element is activated and deactivated during a measurement cycle, wherein a measurement process comprises a plurality of measurement cycles, and wherein in a first measurement cycle the sensor element is deactivated at a first time and in a second measurement cycle the same sensor element is deactivated at a second time.

In yet another embodiment, the invention can be characterized as A LIDAR measuring system having a transmitter unit, a receiver unit and a timing control unit for the time-controlled activation and deactivation of sensor elements of the receiver unit.

BRIEF DESCRIPTION OF THE DRAWINGS

The above and other aspects, features and advantages of several embodiments of the present invention will be more apparent from the following more particular description thereof, presented in conjunction with the following drawings.

FIG. 3 shows a timing chart for a measurement cycle and a corresponding histogram.

FIG. 4 shows a timing chart of a measurement process.

DETAILED DESCRIPTION

Figure 1:
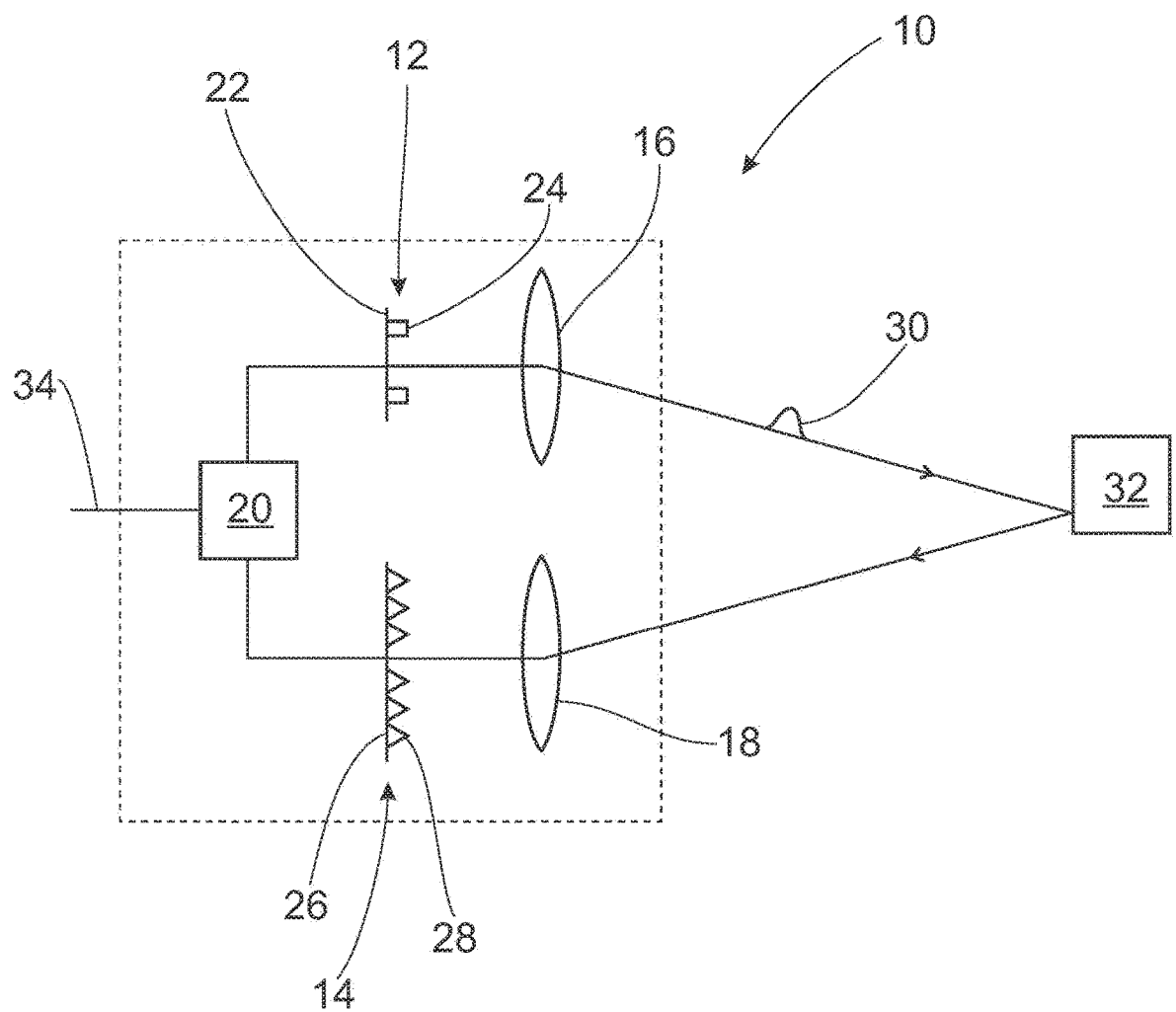
FIG. 1 shows a LIDAR measuring system in a schematic representation.

In a more advantageous embodiment of the LIDAR measuring system, a sensor element is part of a macro cell, wherein the macro cell with a multiplicity of sensor elements is assigned to an emitter element. This allows for compensation of image defects, which may occur, for example, as a result of the optical elements or parallax errors. However, the plurality of sensor elements leads to an excessive detection of ambient radiation. Since usually only a portion of the sensor elements is struck by a reflected laser light, it is advantageous to activate only those sensor elements which are also struck by the laser light.

The object of the invention is therefore to provide a method for keeping an ambient radiation detected by the sensor elements to the minimum possible level.

This object is achieved by the methods described herein. Descriptions of advantageous embodiments of the method are also included.

Such a method is suitable in particular for LIDAR measuring systems that operate according to the TCSPC method (Time Correlated Single Photon Counting). This TCSPC method is explained in more detail in the following text and in particular in the description of the figures. In particular, the method is envisaged for LIDAR measuring systems used in motor vehicles.

A LIDAR measuring system suitable for this purpose comprises sensor elements and emitter elements. An emitter element emits laser light and is implemented, for example, by a VCSEL, Vertical Cavity Surface Emitting Laser. The emitted laser light can be detected by the sensor element, which is formed, for example, by a SPAD, or single photon avalanche diode. The distance of the object from the LIDAR measuring system is determined from the time-of-flight of the laser light or laser pulse.

The emitter elements are preferably implemented on a transmitter chip of a transmitter unit. The sensor elements are preferably implemented on a receiver chip of a receiver unit. The transmitter unit and the receiver unit are assigned to a transmitting lens and a receiving lens respectively. The light emitted by an emitter element is assigned to a solid angle by the transmitting lens. Similarly, a sensor element always observes the same solid angle via the receiving lens. Accordingly, one sensor element is assigned to one emitter element, or both are assigned to the same solid angle. The emitted laser light always strikes the same sensor element after a reflection in the far field.

The sensor elements and emitter elements are advantageously embodied in a focal plane array configuration, FPA. In these, the elements of a particular unit are arranged in a plane, for example, the sensor elements on a plane of the sensor chip. This plane is arranged in the focal plane of the respective lens, and/or the elements are arranged at the focal point of the respective lens.

The FPA configuration allows a static design of the LIDAR measuring system and its transmitter unit and receiver unit, so that the system does not comprise any moving parts. In particular, the LIDAR measuring system is arranged statically on a motor vehicle.

An emitter element is conveniently assigned a multiplicity of sensor elements, which together form a macro cell consisting of a plurality of sensor elements. This macro cell, or all sensor elements of the macro cell, are assigned to an emitter element. This allows imaging effects or imaging defects to be compensated, such as the parallax effect or imaging errors due to the lens.

Optical imaging defects are static, whereas the effect of the parallax depends on the distance from the object to the LIDAR measuring system. For example, in the case of nearby objects, different sensor elements of the macro cell are illuminated than in the case of objects at medium or long range. In addition, permanently activating all sensor elements of the macro causes a background radiation to be detected more strongly than when only the required sensor elements are active.

A sensor element or a portion of the sensor elements would thus be activated and/or deactivated during a measurement cycle in order to minimize the detection of the ambient radiation. This activation and deactivation of the sensor element occurs between the beginning and end of a measurement cycle, in particular between the first activation and the last deactivation of the sensor element or the sensor elements with respect to the measurement cycle.

The sensor elements of the macro cell are divided into sensor groups, for example for the different measurement ranges. For example, the measurement range can be divided into a near range, a medium range and a far range, wherein a different selection of the sensor elements of the macro cell is active in each of the ranges. For this purpose, the sensor elements of the macro cell can be activated and/or deactivated individually, or at least collectively as a respective sensor group. The sensor elements of the sensor groups may partially or completely overlap, or else they may have no overlap within the macro cell. This means that a sensor element can be a member of the sensor group for the medium and the long range, for example, or it can be assigned exclusively to a specific measuring range.

Accordingly, at a transition between the measuring ranges a sensor group with all sensor elements may become deactivated and another non-overlapping sensor group activated. In another variant, a portion of the sensor elements is deactivated, whereas some of the sensor elements remains active. If necessary, in the latter variant other sensor elements that have been previously inactive can also be activated.

Each of the active sensor elements contributes a portion to a noise floor, which is caused by the ambient radiation. With regard to the measurement process and a histogram determined using the TCSPC method, steps emerge between the different measuring ranges, which result from the detection of the ambient radiation by the changing number of active sensor elements. Each sensor element contributes to the noise floor for its active duration.

A measurement process comprises a multiplicity of measurement cycles. The histogram is the result of a measurement process. A measurement cycle has at least the duration required by the laser light to travel back and forth to an object at the maximum measurement distance. The histogram divides the measurement period of a measurement cycle into time segments, also called bins. A bin corresponds to a certain duration of the entire measurement period.

If a sensor element is triggered by an incoming photon, the bin that corresponds to the relevant time of flight starting from the emission of the laser pulse is incremented by the value 1. During a measurement process, the measurement cycle is executed multiple times, so that the ambient radiation essentially fills the bins uniformly. However, an object that reflects the laser light ensures that a specific bin is filled in each measurement cycle, which corresponds to the distance of the object from the LIDAR measuring system. The multiplicity of measurement cycles causes the bins to be filled more than the noise floor at which the object is located. The TCSPC method is explained in more detail in the figure description.

If the respective sensor groups are always switched on at the same time of the measurement cycle relative to the start of another measuring range in all measurement cycles of a measurement process, steps are produced in the histogram. The determination of objects and their distances from the LIDAR measuring system is advantageously carried out by detecting rising edges and/or local maxima. The step represents just such a steep rising edge, although in this case the switching occurs only from one sensor group to another sensor group.

It is proposed that in a first measurement cycle the sensor element is activated at a first time and in a second measurement cycle the same sensor element is activated at a second time. This is also called a time difference.

The first time and the second time are different. A sensor element is activated, in particular, when switching from one measuring range to another measuring range. Alternatively, instead of the sensor element the sensor elements of the respective sensor group can also be activated. By activating the sensor elements in a time-shifted manner from measurement cycle to measurement cycle, the step is flattened into an ascending line, see also description of figures. In this respect, the detection of objects is considerably simplified. The times are preferably based on a reference time, in particular the time of the light emission.

As an example, a measurement process comprises X measurement cycles. In a first measurement cycle, the relevant sensor element or sensor group is activated at bin 100, in the second measurement cycle at bin 101, in the third measurement cycle at bin 102, etc. In the last measurement cycle, the activation occurs at bin 100+X−1. In particular, the noise floor increases slowly and uniformly. The time interval of a bin is selected here as an example, as is the uniform increment between the times. In particular, the time difference between two measurement cycles for the activation of the sensor element or sensor group can be freely selected and can also be changed during a measurement process. The time difference can be positive as well as negative, i.e. the second timing point can be before or after the first timing point. In particular, the times are determined randomly or deterministically.

The object is also achieved by the method wherein in a first measurement cycle the sensor element is deactivated at a first time and in a second measurement cycle the same sensor element is deactivated at a second time.

The statements in relation to the method including the activation at the first time and at the second time also apply to the method including the deactivation at the first time and at the second time. The method of activating sensor elements is the same as that used for deactivating sensor elements, mutatis mutandis.

Thus, a falling edge or step in the noise floor can be prevented and a uniform decrease of the noise background can be achieved instead.

The time difference described is advantageously used for a sensor group to be activated and for one which is to be deactivated essentially at the same time. This results in a smooth transition between the noise levels of the different measuring ranges.

In the following, advantageous embodiments are explained.

It is proposed that the first time occurs before or after the second time.

It is advantageous if the first time and the second time are located within a specified time range.

This time range defines the time period during a measurement cycle within which a changeover between two measuring ranges takes place. If the entire time range is covered evenly and completely by the plurality of timing points, then the width yields the slope of the rise or fall of the noise floor. The stepwise increase in the noise floor is stretched over this period of time, which ensures a flatter increase. The width of the time range of the previous example corresponds to the width of x bins, for example.

The first time and the second time of consecutive measurement cycles are preferably chosen at random.

This random or statistical choice of the timing points for all measurement cycles is possible due to the statistical behaviour of the system. On average, this results in a smooth increase in the noise floor. In particular, the random choice is limited by the specified time range. This can limit the range within which the noise floor increases. Alternatively, the time difference between two consecutive times of consecutive measurement cycles is identical for a measurement process, for example, a bin, as in the previous example.

In a further embodiment, the first time and the second time of consecutive measurement cycles are chosen deterministically.

This can be carried out, for example, by a modulo counter on the basis of which the times are selected with an increasing counter. For example, 10 bins are provided for the transition, so that the times are selected such that the activation or deactivation is filled up bin for bin in correlation with the counter, in particular, increasing in time. If necessary, the bins can also be filled more than once, wherein the counter starts again at 1 after the value 10. Alternatively, the first bin can be filled more than once, after which the next bin is filled multiple times, etc.

As mentioned above, the same timing points can be used for a number of consecutive measurement cycles. This can be carried out in direct succession or with a number of measurement cycles in between. This reduces the width of the time range.

It is advantageous if a time that has already been used in a measurement cycle to activate and/or deactivate a sensor element is eliminated for subsequent measurement cycles of the measurement process.

This also applies to sensor groups. In other words, a time used for activating or deactivating the same sensor element can only be used once. This is conveniently combined with a time range. This allows the use of any time point to be guaranteed despite the random selection.

In another variant, a time can be used for more than one measurement cycle. In particular in the case of statistical selection, the time may be exhausted after a certain number of uses. In the case of a deterministic choice, the number of times any time point is used is already pre-determined.

For each time or bin, a different number of uses may be selected until the time is exhausted.

For example, if 200 measurement cycles with a period of 25 ns are selected, then 4 bins per ns corresponds to 100 bins. Thus each bin is used twice as a start time.

In another example with 200 measurement cycles and a period of 30 ns, at 4 bins per ns there are exactly 120 bins available. For a deterministic pattern of 1, 2, 2, 1, 2, 2, 1, 2, 2, . . . , 40 bins are used once and 120 bins are used twice as a start time.

It is further proposed that if a deactivation of one sensor element is related to an activation of another sensor element, the time delay between the activation and deactivation of the sensor elements is identical or is randomly distributed for all measurement cycles of the measurement process.

Related to in this case refers to the transition from one measuring range to another measuring range, in particular when with respect to the transition from one measuring range to another measuring range one sensor group is activated and another sensor group is deactivated. This is therefore a temporal relationship, since the measuring ranges are advantageously connected together without gaps in order to detect all objects within the entire measuring range.

This means that the activation of the sensor element to be activated is subject to a time difference from measurement cycle to measurement cycle. The sensor element to be deactivated also undergoes a time difference from measurement cycle to measurement cycle. A time offset corresponds to the time interval between the activation and deactivation of the sensor elements of the consecutive measuring ranges. The time offset can be either positive, zero, or negative. If the time difference of the sensor elements to be activated and the time interval of the sensor elements to be deactivated are identical with respect to two consecutive measurement cycles, the time offset for these two measurement cycles also remains the same. If the time intervals are different, the time offset changes from one measurement cycle to the other.

The time offset can thus remain identical for two, more than two, or all measurement cycles or may also vary from measurement cycle to measurement cycle, in particular vary deterministically or randomly, due to the random variation in the time differences.

Advantageously, the time ranges of different sensor groups do not overlap, overlap partially or overlap completely.

This lack of overlap ensures that a particularly accurate measurement is carried out in the transition regions of the measurement sections. If there is no overlap, two sensor groups are preferably active at the same time.

The time ranges for the times for the sensor elements to be activated during a measurement process are preferably the same size as the time ranges for the times for sensor elements to be deactivated. In particular, the time ranges can be identical or different. It is also possible to shift the time ranges relative to one another.

If the time ranges completely overlap, i.e. if one time range fits completely into another or if they are identical, the noise floor and also any useful signal present within the ramp is transferred slowly and evenly from one measuring range to the other, wherein part of the information about a given object in the histogram is in part provided by two sensor groups.

The object is also achieved by a LIDAR measuring system having a transmitter unit, a receiver unit and a timing control unit for the time-controlled activation and deactivation of sensor elements of the receiver unit.

The LIDAR measuring system is preferably designed according to one of the previous embodiments. In particular, the LIDAR measuring system comprises a transmitter unit, a receiver unit and a control unit for the time-controlled activation and deactivation of sensor elements of the receiver unit.

The control unit is part of the electronics. In particular, the control unit comprises the timing control unit. For example, the timing control unit is formed by or comprises a timing controller. In particular, the timing control unit controls the activation and deactivation of the individual elements of the measuring system, in particular the sensor elements and the emitter elements.

In particular, the timing control unit is designed so as to be able to carry out the method as described in the above embodiments. In particular, the timing control unit controls the activation and deactivation of the sensor elements depending on the reference time, which corresponds, for example, to the transmission of the light pulse. This time can be detected by a sensor or can be determined internally by the timing control unit, for example because the timing control unit also controls the transmission of the laser pulse.

Conveniently, the timing control unit specifies the times for activating and deactivating the sensor elements for each measurement cycle according to the previous variants.

In the following, the method and the LIDAR measuring system are explained again in detail based on several figures.

FIG. 1 shows the structure of a LIDAR measuring system 10 in schematic form. Such a measuring system 10 is intended for use on a motor vehicle. In particular, the measuring system 10 is arranged statically on the motor vehicle and, in addition, is conveniently designed statically itself. This means that the measuring system 10, as well as its components and modules, cannot or do not perform any relative movement with respect to each other.

The measuring system 10 comprises a LIDAR transmitter unit 12, a LIDAR receiver unit 14, a transmitting lens 16, a receiving lens 18 and electronics 20.

The transmitter unit 12 forms a transmitter chip 22. This transmitter chip 22 has a multiplicity of emitter elements 24, which for clarity of presentation are shown schematically as squares. On the opposite side the receiver unit 14 is formed by a receiver chip 26. The receiver chip 26 comprises a multiplicity of sensor elements 28. The sensor elements 28 are shown schematically by triangles. However, the actual shape of emitter elements 24 and sensor elements 28 can differ from the schematic representation. The emitter elements 24 are preferably formed by VCSELs, vertical cavity surface-emitting lasers. The sensor elements 28 are preferably formed by SPADs, single photon avalanche diodes.

The transmitter unit 12 and the receiver unit 14 are designed in an FPA configuration, or focal plane array. This means that the chip and its associated elements are arranged on a plane, in particular a flat plane. The respective plane is also arranged at the focal point or in the focal plane of an optical element 16, 18. Similarly, the emitter elements 24 are arranged on a plane of the transmitter chip 22 and are located on the measuring system 10 within the focal plane of the transmitting lens 16. The same applies to the sensor elements 28 of the receiver chip 26 with respect to the receiver lens 18.

A transmitting lens 16 is assigned to the transmitter unit 12, and a receiving lens 18 is assigned to the receiver unit 14. A laser light emitted by the emitter element 24 or a light incident on a sensor element 28 passes through the respective optical element 16, 18. The transmitting lens 16 assigns a specific solid angle to each emitter element 24. Likewise, the receiving lens 18 assigns a specific solid angle to each sensor element 28.

A laser light emitted by the respective emitter element 24 is always radiated by the transmitting lens 16 into the same solid angle. Due to the receiving lens 18, the sensor elements 28 also always observe the same solid angle. Accordingly, a sensor element 28 is always assigned to the same emitter element 24. In particular, a sensor element 28 and an emitter element 24 observe the same solid angle. As FIG. 1 shows a schematic representation, the solid angle in FIG. 1 is not shown correctly. In particular, the distance from the measuring system to the object is many times greater than the dimensions of the measuring system itself.

Figure 2:
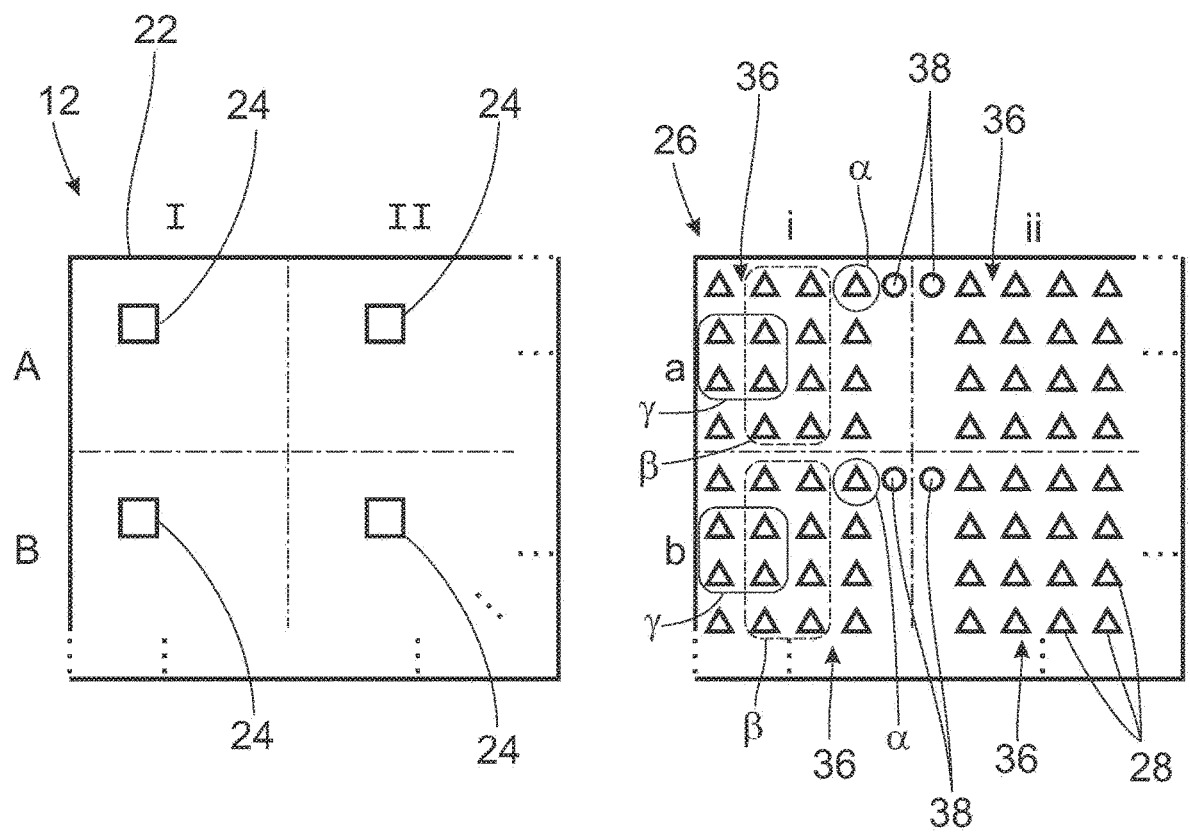
FIG. 2 shows a transmitter unit and a receiver unit of the LIDAR measuring system from FIG. 1 in a front view.

In this LIDAR measuring system 10, a multiplicity of sensor elements 28 is assigned to a single emitter element 24, see FIG. 2. The sensor elements 28 which are assigned to a common emitter element 24 are part of a macro cell 36, the macro cell 36 being assigned to the emitter element 24.

An emitter element 24 emits laser light 30 in the form of a laser pulse 30 at the beginning of a measurement cycle. This laser pulse 30 passes through the transmitting lens 16 and is emitted in the solid angle assigned to the emitter element 24. If an object 32 is located within this solid angle, at least part of the laser light 30 is reflected from it. The reflected laser pulse 30, coming from the corresponding solid angle, is directed by the receiving lens 18 onto the associated sensor element 28 or the sensor elements 28 belonging to a macro cell 36. The sensor elements 28 detect the incident laser pulse 30, wherein a triggering of the sensor elements 28 is read out by a TDC 38, Time to Digital Converter, and written into a histogram. Using the time of flight method, the distance from the object 32 to the measuring system 10 can be determined from the transit time of the laser pulse 30. The objects 32 and their distances are determined advantageously using the TCSPC method, time correlated single photon counting. The TCSPC method is described in more detail in the following.

The sequence of such a measurement cycle is controlled by the electronics 20, which can read out at least the sensor elements 28. The electronics 20 is also connected or can be connected to other electronic components of the motor vehicle via a connection 34, in particular for data exchange. The electronics 20 here is shown as a schematic building block. However, further detailed descriptions of this will not be provided. It should be noted that the electronics 20 can be distributed over a multiplicity of components or assemblies of the measuring system 10. In this case, for example, a part of the electronics 20 is implemented on the receiver unit 14.

FIG. 2 shows the transmitter chip 22 and the receiver chip 26 schematically in a front view. Only a partial detail is shown, the additional areas being essentially identical to the ones shown. The transmitter chip 22 comprises the emitter elements 24 already described, which are arranged in rows and columns. However, this row and column arrangement is only chosen as an example. The columns are marked with upper case Roman numerals, the rows with upper case Latin letters.

The receiver chip 26 comprises a plurality of sensor elements 28. The number of sensor elements 28 is greater than the number of emitter elements 24. The sensor elements 28 are also implemented in a row and column arrangement. This row and column arrangement is also selected purely as an example. The columns are numbered with lower case Roman numerals, the rows with lower case Latin letters. However, a row or column of the receiver chip 26 does not relate to the individual sensor elements 28, but to a macro cell 36, which has a multiplicity of sensor elements 28. The macro cells 36 are separated from each other by dashed lines for clearer presentation. The sensor elements 28 of a macro cell 36 are all assigned to a single emitter element 24. For example, the macro cell i, a is assigned to the emitter element I, A. A laser light 30 emitted by an emitter element 24 maps onto at least part of the sensor elements 28 of the associated macro cell 36.

The sensor elements 28 can be activated and deactivated individually or at least in groups. As a result, the relevant sensor elements 28 of a macro cell 36 can be activated and the irrelevant ones can be deactivated. This enables the compensation of imaging errors. Such imaging errors can be, for example, static errors, such as imaging errors of the optical elements 16, 18 or else parallax errors, an example of which is explained in the following section.

Due to the parallax, for example, a laser light 30 emitted in the near range, i.e. at a small distance from the object 32, is imaged onto the sensor elements 28 of the macro cell 36 arranged at the top of FIG. 2. However, if the object is further away from the measuring system 10, the reflected laser light 30 will strike a lower region of the macro cell 36 and hence the lower sensor elements 28. The displacement of the incident laser light due to the parallax depends in particular on the arrangement of the units and the physical design of the measuring system 10.

The sensor elements 28 of a macro cell 36 are therefore activated and deactivated during a measurement cycle, so that unilluminated sensor elements are deactivated. Since each active sensor element detects the ambient radiation as noise floor, disabling the unilluminated sensor elements keeps the noise floor of a measurement to a minimum. As an example, three sensor groups are drawn on the receiver chip 26 in FIG. 2.

By way of example, the sensor groups α, β and γ are shown here, which are intended solely to explain the method. In principle, the sensor groups can also be chosen differently. The sensor group α comprises a single sensor element 28, with which a near range is to be detected at the beginning of the measurement cycle. The sensor group β comprises a multiplicity of sensor elements 28 which are active at a medium measurement distance. The sensor group γ comprises several sensor elements 28 which are active in a far range. The number of sensor elements 28 of the sensor group β is the largest, followed by the sensor group γ.

The selection of the sensor elements 28 for the sensor groups α, β and γ is chosen purely as an example and in an application case it can also differ from those shown, as can the design of the sensor elements 28 and the arrangement in relation to the emitter elements 24.

In the near range, only a small number of sensor elements 28 is normally active. For example, these sensor elements 28 can also differ in design from the other sensor elements 28 to satisfy specific requirements for the near range.

The sensor group γ is a partial detail from the sensor group (3, but also comprises two sensor elements 28 which are exclusive to the sensor group γ. For example, the different sensor groups can also overlap completely, i.e. have a number of common sensor elements 28. However, all sensor elements 28 can also be exclusively assigned to this sensor group. It may also occur that only a portion of the sensor elements 28 is exclusive to one sensor group, the remaining sensor elements 28 being part of more than one sensor group.

At a transition from a first measurement range to a second measurement range, for example from the medium range to the far range, only some of the sensor elements of the previously active sensor group are then deactivated, wherein some of the sensor elements remain activated and a further number of sensor elements 28 may be activated.

The sensor elements 28 are connected to a TDC 38, time to digital converter. This TDC 38 is part of the electronics 20. A TDC 38 is implemented on the receiver unit for each macro cell 36 and is connected to all sensor elements 28 of the macro cell 36. However, this design variant for the TDC 38 is only an example.

A sensor element 28 implemented as a SPAD, which is simultaneously active, can be triggered by an incident photon. This triggering is read out by the TDC 38. The TDC 38 then enters this detection into a histogram of the measurement process. This histogram is explained in more detail in the following. After a detection, the required bias voltage must first be re-established on the SPAD. Within this period, the SPAD is blind and cannot be triggered by incident photons. This time required for charging is also known as dead time.

It should also be noted in this context that an inactive SPAD takes a certain amount of time to build up the operating voltage.

The emitter elements 24 of the measuring system 10 emit their light pulses sequentially, for example line by line or row by row. This prevents a row or column of emitter elements 24 from triggering the sensor elements 28 of the adjacent row or column of macro cells 36. In particular, the only sensor elements 28 of the macro cells 36 that are active are those for which the corresponding emitter elements 24 have emitted a laser light 30.

As mentioned earlier, the TCSPC method is provided for determining the distance of the objects. This is explained on the basis of FIG. 3. In the TCSPC, a measurement process is performed to determine any objects present and their distance from the measuring system 10. A measurement process comprises multiple essentially similar measurement cycles, which are repeated identically to produce a histogram.

This histogram is then evaluated to identify any objects and their distances. FIG. 3 comprises a number of sub-figures a, b, c, d, e, f, g, each of which has its own Y-axis, but shares a common X-axis on which time is plotted. FIGS. 3a to 3f show a single measurement cycle, wherein FIG. 3g shows the result of an entire measurement process. A measurement process starts at time $t_{start}$ and ends at time $t_{ende}$.

FIG. 3a shows the activity of an emitter element 46 over the course of a measurement cycle. The emitter element is activated at the time $t_2$ and deactivated shortly afterwards at the time $t_2$, causing a laser pulse to be emitted.

Figures b, c and d show the activity phases of the sensor elements 28 of the sensor groups α, β and γ within a measurement cycle. The sensor element of the sensor group α is already charged before the emission of the laser pulse at time $t_0$ and is already active at time $t_1$. The times $t_1$ and $t_2$ can temporally coincide or be offset relative to each other. The sensor group α is therefore active at the latest when the laser pulse 30 is emitted. This corresponds to the near range.

The sensor elements of the sensor group (3 are charged shortly before the sensor group α is deactivated at time $t_3$ and are active at the time $t_4$, when the sensor group α is deactivated. The sensor group β, which covers the medium range, remains active for a longer period of time until it is switched off at the transition to the far range.

The activity of the sensor elements 28 of the sensor group γ is shown in FIG. 3d. Since the sensor group γ is partly a subgroup of 13, the overlapping sensor elements 28 are left active at time $t_7$, whereas the other sensor elements 28 of the sensor group β are deactivated. The remaining sensor elements 28 of the sensor group γ are already charged in advance at time $t_6$. The sensor group γ also remains active for a longer period of time until it is deactivated at the time $t_8$. The time $t_8$ also corresponds to the end of the measurement cycle at time $t_{ende}$. However, in other exemplary embodiments, the end of the measurement cycle does not need to be exactly the same as the deactivation of the last active sensor group. The beginning of the measurement cycle 42 is defined by the time $t_{start}$ and the end of the measurement cycle 44 is defined by the time $t_{ende}$.

The measurement cycle thus includes the emission of the laser pulse 46, the switching between the sensor groups and the detection of incident light in the near range 48, in the medium range 50 and in the far range 52.

FIG. 3e shows an example of an object 32 which is situated in the medium range. The illustration corresponds to the reflection surface of the object 32. The laser pulse 30 reflected at the object 32 can be detected by the active sensor elements 28 of the sensor group β at the time $t_5$.

FIG. 3f shows a histogram 54, which represents an exemplary filling of a plurality of measurement cycles. The histogram divides the whole of the measurement cycle into individual time segments. Such a time segment of a histogram 54 is also called a bin 56. The TDC 38, which populates the histogram 54, reads out the sensor elements 28. Only an active sensor element 28 can transmit a detection to the TDC 38. If a SPAD is triggered by a photon, the TDC 38 fills the histogram, which is represented by a memory, for example, with a digital 1 or a detection 58. The TDC associates this detection 58 with the current time and fills the corresponding bin 56 of the histogram 54 with the digital value.

Since there is only a single object 32 in the medium range, only this one object 32 can be detected. Nevertheless, the histogram is filled with detections 58 over the entire measurement cycle. These detections 58 are generated by the background radiation. The photons of the background rays can trigger the SPADs. The level of the resulting noise floor is therefore dependent on the number of active SPADs, i.e. the number of sensor elements 28 of a sensor group.

It can be seen that in the near range 48 only two bins 56 are filled with one detection 58 each, while a third bin remains empty. This corresponds to the detected background radiation. The number of detections is very small, as only a single SPAD is active.

In the medium range 50 that follows it, the sensor group β is active, which has a plurality of active sensor elements 28. Accordingly, the detected background radiation is also larger, so that one bin is filled on average with three detections 58, sometimes also 4 or 2 detections 58. In the region 32, in which the reflecting surface of the object 32 is located at time $t_5$ of the measurement cycle, the number of detections 58 is significantly higher. In this case, seven or eight 58 detections are recorded in the histogram 54.

There is no object that can be detected in the far range 52. Here, only the background radiation is represented with an average of one to two detections 58 per bin. The mean value of the noise floor is therefore lower than in the medium range 50, as the number of SPADS is also lower. However, the mean value of the detections 58 is higher than in the near range 48, since the near range 48 with the sensor group α only shows a fraction of the number of sensor elements 28 of the sensor group γ.

As mentioned above, the histogram shown is filled in an exemplary way only. The number of bins and their filling level can differ significantly in actual measurement cycles. Normally, no object 32 can yet be detected from a single measurement cycle or few measurement cycles. Therefore, with the TCSPC method a plurality of measurement cycles are carried out in succession. Each measurement cycle populates the same histogram. Such a histogram, which has been filled by a plurality of measurement cycles, is shown in FIG. 3g.

The histogram of FIG. 3g is also formed by digitally filled bins. To provide a clearer picture, however, the representation of each bin has been omitted in this figure and instead only a line has been drawn corresponding to the filling level of the bins.

A low noise floor is obtained in the near range 48, and the highest noise floor is obtained in the medium range 50, since it is here that the most sensor elements are also active. In the far range 52, the noise floor determined is between that of the near range 48 and that of the medium range 50. In addition, the detection of the laser light 30 reflected by the object 32 in the medium range 50 can be seen in the form of a peak 33. The detected background radiation is statistically uniformly distributed, thus providing an essentially straight line depending on the number of active sensor elements. However, the object and its reflecting surface are always at the same place and over the sum of the measurement cycles the peak 33 stands out over the noise floor.

In the determination of the histogram according to FIG. 3g, the measurement cycle of FIG. 3 was repeated identically many times over. In particular, all described actions are always performed at the same times $t_0$ to $t_8$.

The histogram of FIG. 3g is now evaluated to identify objects and determine their distances. For detection, the rise, i.e. a steeply rising edge of the histogram shape, is usually evaluated. From the time interval at which the object 32 is located, the distance to the object can then be calculated via the speed of light. In the histogram according to FIG. 3g, a problem occurs when the object is located at a distance that corresponds to the switchover range between the near and medium range, and between the medium range and the long range.

If it is then stipulated that no evaluation of potential objects takes place at the switchover times, then the system would be blind in these transition regions. On the other hand, if this stipulation is not made, one would always detect a static object at the switchover times even if there is none there, or one could not distinguish an actual signal from the edge of the switchover time. This problem is solved by the following designs for controlling the sensor elements. This method will be explained in more detail by reference to FIG. 4.

The basic sequence of a measurement cycle is unchanged from that shown in FIG. 3b. However, each measurement cycle of the measurement process differs slightly from the other measurement cycles. FIGS. 4a, b, c, d, e, show the same processes as FIGS. 3a, b, c, d, but for three different measurement cycles. For example, a first measurement cycle of the measurement process is represented by the solid line 60, a final measurement cycle of the measurement process by the dashed line 64 and an intermediate measurement cycle of the measurement process by the dotted line 62. With regard to the sub-figures a, b, c, d, the respective lines are supplemented by the suffixes b, c, d.

In the following, only the times at which a sensor group and its sensor elements are activated and deactivated are described. If these elements are SPADs, they must also be charged. However, for the sake of simplicity, this charging phase is not described. The previous statements in relation to FIG. 3 concerning the measurement cycle and the measuring process also apply to the following statements, provided that they do not contradict the former.

At a time $t_a$, the sensor group α is activated during the measurement cycle 60, 62 and 64. This time $t_a$ remains unchanged for all measurement cycles of the measurement process.

The emitter element 24 is activated at time $t_b$ and deactivated at time $t_c$, causing the laser pulse 30 to be emitted. The time $t_a$ occurs before the time $t_b$ or else both are the same.

The first sensor group α is deactivated during the measurement cycle 60 at the time $t_d$, when the sensor group β is activated. However, in a later measurement cycle 62 of the same measurement process, the first sensor group α is not deactivated until a later time $t_e$. Similarly, during the measurement cycle 62 the sensor group β is only activated at time $t_e$. And with regard to the measurement cycle that follows again later, the sensor group α and the sensor group β are only deactivated or activated at a time $t_f$. In particular, the time $t_f$ is after the time $t_e$, which in turn is after time $t_d$. The length of the near range 48 and the length of the medium range 50 as well as their end or beginning are time-shifted over the number of measurement cycles. This causes the steeply rising step to be flattened, see also FIG. 4f. If the time differences between the times of the individual measurement cycles are identical, a uniform increase is obtained. For example, such a time difference can be equal to the duration of a bin. In principle, the time differences can differ from measurement cycle to measurement cycle, wherein a uniform distribution of the time differences is preferred.

The time interval with respect to a single timing point in two measurement cycles is called the time difference.

The flat rise or fall of the noise floor results from the fact that the sensor group β contributes a component to the noise floor from the time $t_d$ in the measurement cycle 60. However, during a measurement cycle 62, a component of the noise floor is only introduced from time $t_0$ and in the measurement cycle 64 only from time $t_f$. Accordingly, the noise floor increases slowly and steadily. Since the histogram divides the measurement period of a measurement cycle into bins, the increase continues to be essentially stepwise. However, the steps are so small that they do not cause a problem in the evaluation of the histogram. In particular, the ramps are extended to a duration greater than the duration of the light pulse, in particular a multiple of the duration of the light pulse.

In a subsequent evaluation of the histogram, an object at the transition between the different measuring ranges can be easily detected. Moreover, this can also prevent a false detection.

The activation of the sensor group α does not require any such time differences, as the laser pulse is always emitted at the same time and the sensor group α is then already active.

The transition from sensor group β to sensor group γ behaves like the transition from sensor group α to sensor group β. For the measurement cycle 60 this is the time $t_h$, for the measurement cycle 62 the time $t_1$ and for the measurement cycle 64 the time $t_k$.

Therefore, the decrease in the histogram from the noise floor of the medium range 50 to the noise floor of the far range 52 is flatter and more even.

Optionally, the far range 52 can also be deactivated at the times $t_1$, $t_m$ and $t_n$, time offset with a time difference.

The times can be randomly selected from measurement cycle to measurement cycle. In particular, a time difference is selected at random from measurement cycle to measurement cycle. As a result, the resulting statistical mean is a uniformly increasing noise floor. A time range 66 of from $t_d$ to $t_f$ is specified, from which the times are randomly selected. A further time range 68 extends from $t_h$ to $t_k$.

Alternatively, the times can also be chosen deterministically, for example by means of a predefined pattern. Preferably, the deterministic choice provides a uniform distribution of the times.

Optionally, a time within the time range 66, 68 which has already been used to activate or deactivate a sensor group can no longer be selected for further measurement cycles. For example, if the time $t_e$ is selected in the first measurement cycle, then this time is no longer available for the subsequent measurement cycles. This allows a random selection to be made but a predetermined set of times can still be used. In particular, such a statistical selection can eliminate certain sources of error.

According to FIGS. 4c and 4d, the sensor group β is deactivated at the same time as the sensor group γ is activated. Therefore, a time offset between the deactivation of the sensor elements of the sensor group β and the activation of the sensor elements of the sensor group γ is zero. This time offset is identical for all measurement cycles 60, 62 and 64 and does not change over the entire measurement process.

The time offset is the time difference between a time at which a sensor group is deactivated and a time at which a sensor group is activated, within a single measurement cycle.

In an alternative embodiment, this time offset can be non-zero. For example, the sensor group γ is activated and the sensor group β is not deactivated until the time offset has elapsed. This is also possible in the opposite direction. Such an identical time offset when switching between two sensor groups is advantageous if the sensor groups have overlapping sensor elements. This ensures the uniform increase or decrease of the noise floor.

However, the time offset can also change from measurement cycle to measurement cycle. This is possible, for example, if there is no overlapping of the sensor elements between the consecutive sensor groups.

The random selection is useful, for example, if the times for deactivating the sensor group β and the times for activating the sensor group γ are selected randomly and independently of each other. However, as already mentioned, a deterministic selection is also possible.

For carrying out the method the electronics 20 of the measuring system has a timing control unit. This timing control unit defines the time for the measuring system and also controls the chronological sequence of the elements. In particular, it specifies the time for the histogram, and controls the activation and deactivation of the individual sensor elements and emitter elements. In addition, the timing control unit enables the histograms to be added correctly. The timing control unit also specifies the times for each measurement cycle at which the individual elements are activated and deactivated.

The invention claimed is:

1. A device for optically measuring distances in a measuring region, comprising:
   a transmitting unit, the transmitting unit comprising an emitter elements adapted to emit measuring pulses into the measuring region;
   a receiving unit, the receiving unit comprising a plurality of sensor elements adapted to receive reflected measuring pulses transmitted by the emitter element; and
   wherein the device is adapted to perform a plurality of measurement cycles in a measurement process, and for each measurement cycle in the measurement process;
  emit a measuring pulse from the emitter element;
  activate a first sensor element of the plurality of sensor elements during a first active time period of the measurement cycle; and
  activate a second sensor element of the plurality of sensor elements during a second active time period of the time period of the measurement cycle;
  wherein the first active time period is different for each of the measurement cycles in the plurality of measurement cycles and the second active time period is different for each of the measurement cycles in the plurality of measurement cycles.

2. The device according to claim 1 wherein the first active time period and the second active time period do not overlap in each of the measurement cycles in the measurement process.

3. The device according to claim 2 wherein the device is further adapted to:
  receive reflected measuring pulses at receiving times using at least one of the first and second sensor elements of the plurality of sensor elements, wherein the reflected measuring pulses result from reflections of measuring pulses transmitted in multiple measuring cycles;
  determine times-of-flight for the received reflected measuring pulses;
  enter the times-of-flight for the received reflected measuring pulses into a histogram for the receiving element, the histogram including a plurality of bins, each of the plurality of bins corresponding to a defined bin period in a measurement cycle; and
  determine a distance measurement using the histogram.

4. The device according to claim 1 wherein the first and second active time periods of measurement cycles in the plurality of measurement cycles are different by having different deactivation times in the plurality of measurement cycles.

5. The device according to claim 1 wherein the first and second active time periods of measurement cycles in the plurality of measurement cycles are different by having different activation times in the plurality of measurement cycles.

6. The device according to claim 1 wherein the first and second active time periods of measurement cycles in the plurality of measurement cycles are different by using randomly selected values for the first and second active time periods in the plurality of measurement cycles.

7. The device according to claim 1 wherein the first and second active time periods of measurement cycles in the plurality of measurement cycles are different by using deterministically selected values for the first and second active time periods in the plurality of measurement cycles.

8. The device according to claim 1 wherein the first and second active time periods of measurement cycles in the plurality of measurement cycles are different by using an offset between activation times and deactivation times for consecutive measurement cycles in the plurality of measurement cycles.

9. A method for optically measuring distances in a measuring region, the method comprising:
  performing a plurality of measurement cycles in a measurement process, and for each measurement cycle in the measurement process:
    emitting a measuring pulse from an emitter element;
    activating a first sensor elements during a first active time period of the measurement cycle, where the first sensor elements is adapted to receive reflected measuring pulses transmitted by the emitter element; and
    activating a second sensor element during a second active time period of the measurement cycle, wherein the second sensor element is adapted to receive the reflected measuring pulses transmitted by the emitter element:
    wherein the first active time period is different for each of the measurement cycles in the plurality of measurement cycles and the second active time period is different for each of the measurement cycles in the plurality of measurement cycles.

10. The method according to claim 9 wherein the first active time period and the second active time period do not overlap in each of the measurement cycles in the measurement.

11. The method according to claim 9 further comprising:
  receiving reflected measuring pulses at receiving times using at least one of the first and second sensor elements of the plurality of sensor elements, wherein the effected measuring pulses result from reflections of measuring pulses transmitted in multiple measuring cycles;
  determining times-of-flight for the received reflected measuring pulses;
  entering the times-of-flight for the received reflected measuring pulses into a histogram for the receiving element, the histogram including a plurality of bins, each of the plurality of bins corresponding to a defined bin period in a measurement cycle; and
  determining a distance measurement using the histogram.

12. The method according to claim 9 wherein the first and second active time periods of measurement cycles in the plurality of measurement cycles are different by having different deactivation times in the plurality of measurement cycles.

13. The method according to claim 9 wherein the first and second active time periods of measurement cycles in the plurality of measurement cycles are different by having different activation times in the plurality of measurement cycles.

14. The method according to claim 9 wherein the first and second active time periods of measurement cycles in the plurality of measurement cycles are different by using randomly selected values for the first and second active time periods in the plurality of measurement cycles.

15. The method according to claim 9 wherein the first and second active time periods of measurement cycles in the plurality of measurement cycles are different by using deterministically selected values for the first and second active time periods in the plurality of measurement cycles.

16. The method according to claim 9 wherein the first and second active time periods of measurement cycles in the plurality of measurement cycles are different by using an offset between activation times and deactivation times for consecutive measurement cycles in the plurality of measurement cycles.

17. A method for optically measuring distances in a measuring region, the method comprising:
  performing a plurality of measurement cycles in a measurement process, and for each measurement cycle in the measurement process:

emitting a measuring pulse from an emitter element;

activating a first sensor element during a first active time period of the measurement cycle, where the first sensor element is adapted to receive reflected measuring pulses during the first active time period;

wherein the first active time period of measurement cycles in the plurality of measurement cycles are different;

activating a second sensor element during a second active time period of the measurement cycle, where the second sensor elements is adapted to receive reflected measuring pulses during the second time period; and wherein the second active time period is different for each of the measurement cycles in the plurality of measurement cycles.

18. The method according to claim 17 wherein the first active time period of measurement cycles in the plurality of measurement cycles are different by having different deactivation times in the plurality of measurement cycles and wherein the second active time period of measurement cycles in the plurality of measurement cycles are different by having different deactivation times in the plurality of measurement cycles.

19. The method according to claim 17 wherein the first active time period of measurement cycles in the plurality of measurement cycles are different by having different activation times in the plurality of measurement cycles and wherein the second active time period of measurement cycles in the plurality of measurement cycles are different by having different activation times in the plurality of measurement cycles.

20. The method according to claim 17 wherein the first active time period of measurement cycles in the plurality of measurement cycles are different by using randomly selected values for the first active time periods in the plurality of measurement cycles and wherein the second active time period of measurement cycles in the plurality of measurement cycles are different by using randomly selected values for the second active time periods in the plurality of measurement cycles.

* * * * *